United States Patent [19]
Falkenberg et al.

[11] Patent Number: 5,715,348
[45] Date of Patent: Feb. 3, 1998

[54] FIBER MANAGEMENT SYSTEM AND METHOD FOR ROUTING OPTICAL FIBER HAVING A MINIMUM BEND RADIUS

[75] Inventors: Dean R. Falkenberg, Windsor; Russell L. Tucker, San Ramon, both of Calif.

[73] Assignee: Next Level Communications, Rohnert Park, Calif.

[21] Appl. No.: 624,039

[22] Filed: Mar. 27, 1996

[51] Int. Cl.$^6$ ................................................ G02B 6/00
[52] U.S. Cl. .................................... 385/135; 385/147
[58] Field of Search .......................... 385/134, 135, 385/136, 137, 138, 139, 140, 147

[56] References Cited

U.S. PATENT DOCUMENTS

| | | | |
|---|---|---|---|
| 5,127,082 | 6/1992 | Below et al. | 385/135 |
| 5,208,894 | 5/1993 | Johnson et al. | 385/147 |
| 5,402,515 | 3/1995 | Vidacovich et al. | 385/135 |
| 5,442,725 | 8/1995 | Peng | 385/135 |
| 5,530,787 | 6/1996 | Arnett | 385/137 |
| 5,546,495 | 8/1996 | Bruckner et al. | 385/137 |

OTHER PUBLICATIONS

ADC Telecommunications, "Fiber Panel Products, 1st Ed., VAM System Chassis Ordering Info," Jan., 1995, p. 31.

*Primary Examiner*—Akm E. Ullah
*Attorney, Agent, or Firm*—Skjerven, Morrill, MacPherson, Franklin & Friel; David W. Heid; E. Eric Hoffman

[57] ABSTRACT

A fiber management system for routing a plurality of optical fibers having a minimum bend radius. The fiber management system includes a fiber guide and one or more fiber trays. The fiber guide includes a plurality of fingers for retaining the optical fiber. At least one of the fingers has a curved portion with a radius selected to insure that the optical fiber does not bend past its minimum bend radius when routed over the finger. The fiber tray, which routes the optical fiber to the fiber guide, has a curved lip with a radius at least as large as the minimum bend radius of the optical fiber. The fiber tray and fiber guide are positioned such that the curved lip of the fiber tray is adjacent to the curved portion of the finger. The optical fibers are routed over the curved lip of the fiber tray and the curved portion of the corresponding finger, thereby allowing the fibers to be routed without being bent past the minimum bend radius.

25 Claims, 8 Drawing Sheets

FIBER MANAGEMENT SYSTEM AND METHOD FOR ROUTING OPTICAL FIBER HAVING A MINIMUM BEND RADIUS

BACKGROUND OF THE INVENTION

The present invention relates to a system and method for organizing optical fiber. More particularly, the present invention relates to a system and method for organizing a plurality of optical fibers in a host digital terminal (HDT).

DESCRIPTION OF THE PRIOR ART

FIG. 1 is a schematic diagram of a conventional fiber-to-the-curb communication system which includes central office 1, host digital terminal (HDT) 2, optical fiber 3 and optical network unit (ONU) 4. ONU 4, which is a small field terminal, serves eight subscribers 11–18 from optical fiber 3. Other ONUs typically serve sixteen subscribers. Because of the relatively high fiber to subscriber ratio (e.g., 1:8), a large number of optical fibers are accumulated in central office. For example, there can be 64 or more optical fibers which connect to each HDT 2 in central office 1. Central office 1 can include hundreds of HDTs. Each optical fiber is connected to a corresponding optical distribution unit (ODU) in HDT 2. For example, optical fiber 3 is connected to ODU 20.

In order to efficiently connect and disconnect the fibers located in central office 1, it is important to be able to easily locate and remove any particular fiber from the group. It is also important to control the routing of each optical fiber such that the smallest bend radius within each optical fiber is greater than a permitted minimum bend radius. Creating a bend radius less than the minimum bend radius results in increased loss and attenuation of the optical signal.

Conventional fiber management systems, such as ADC Telecommunications, Inc. Fiber Panel Products—FL2000 VAM System, have not provided adequate solutions to the above-described problems. Accordingly, it would be desirable to have a fiber management system which allows each optical fiber to be easily located and removed from an HDT. It would also be desirable if this system limited the permitted minimum bend radius within each fiber to an acceptable value.

SUMMARY

Accordingly, the present invention provides a fiber management system which includes a fiber guide and one or more fiber trays. The fiber guide includes a plurality of fingers for retaining the optical fiber. At least one of the fingers has a curved portion with a radius at least as large as the minimum bend radius of the optical fiber. The fiber tray, which routes the optical fiber to the fiber guide, has a curved lip with a radius at least as large as the minimum bend radius of the optical fiber. The fiber tray and fiber guide are positioned such that the curved lip of the fiber tray is adjacent to the curved portion of the finger.

First securing means are provided for securing the optical fiber within the fiber guide. Second securing means are provided for securing the optical fiber within the fiber tray. The optical fiber is routed over the curved lip of the fiber tray and the curved portion of the corresponding finger, thereby allowing the fiber to be routed without being bent past the minimum bend radius. In a particular embodiment, the fiber guide is mounted vertically on an HDT and the fiber tray is mounted horizontally on the HDT.

In one embodiment, the first securing means includes a lance which protrudes from a backplate of the fiber guide. A tie is looped through the lance and around the optical fiber, thereby securing the optical fiber to the backplate. The second securing means can include one or more hairpin retainers secured to the fiber tray. The manner in which the optical fiber is routed and secured insures that the optical fiber remains in an unstressed condition, thereby advantageously minimizing the minimum bend radius of the optical fiber.

The present invention will be more fully understood in light of the following detailed description taken together with the drawings.

DETAILED DESCRIPTION

Figure 1:
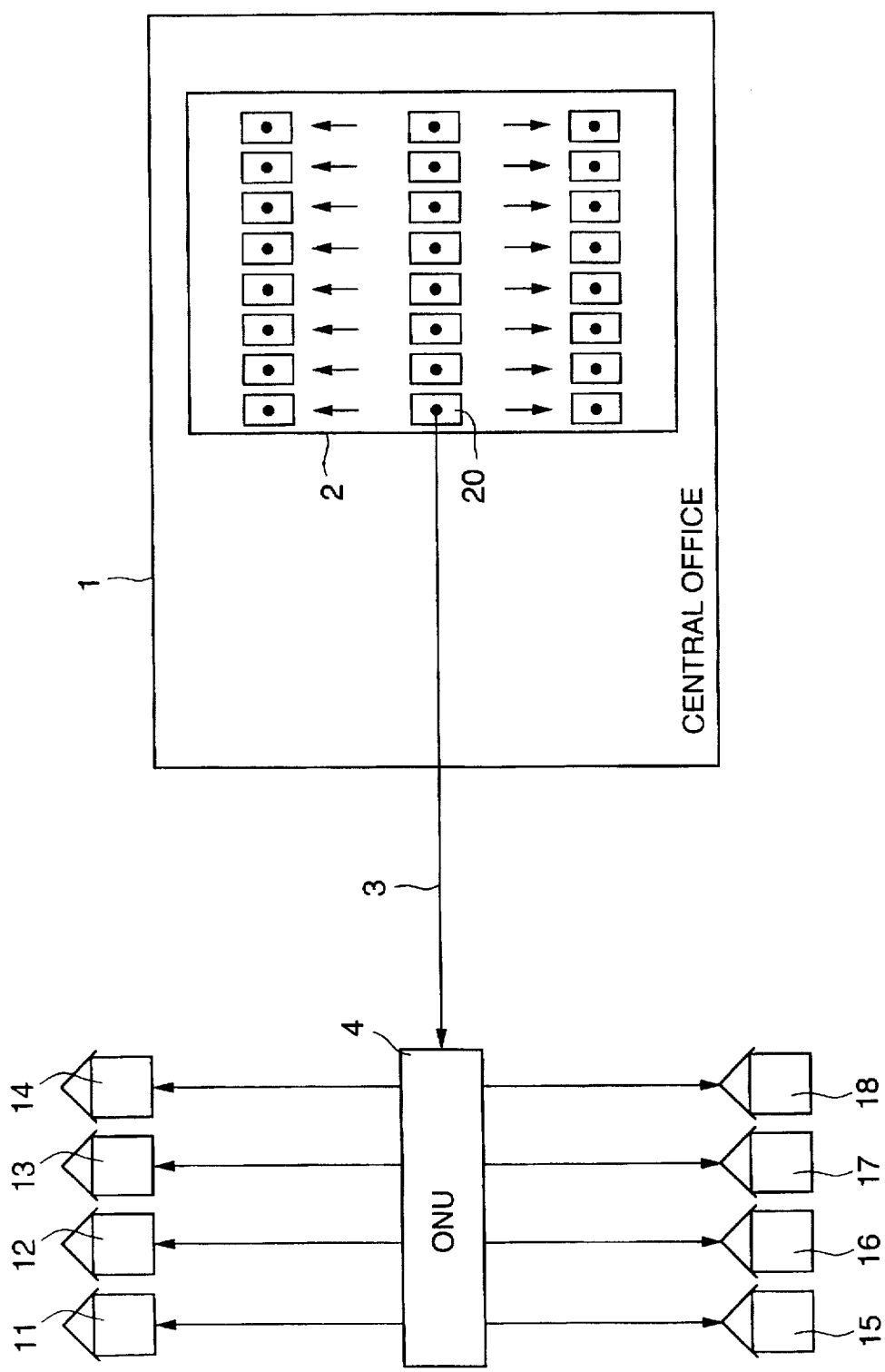
FIG. 1 is a schematic diagram of a conventional fiber-to-the-curb communication system.
Figure 2:
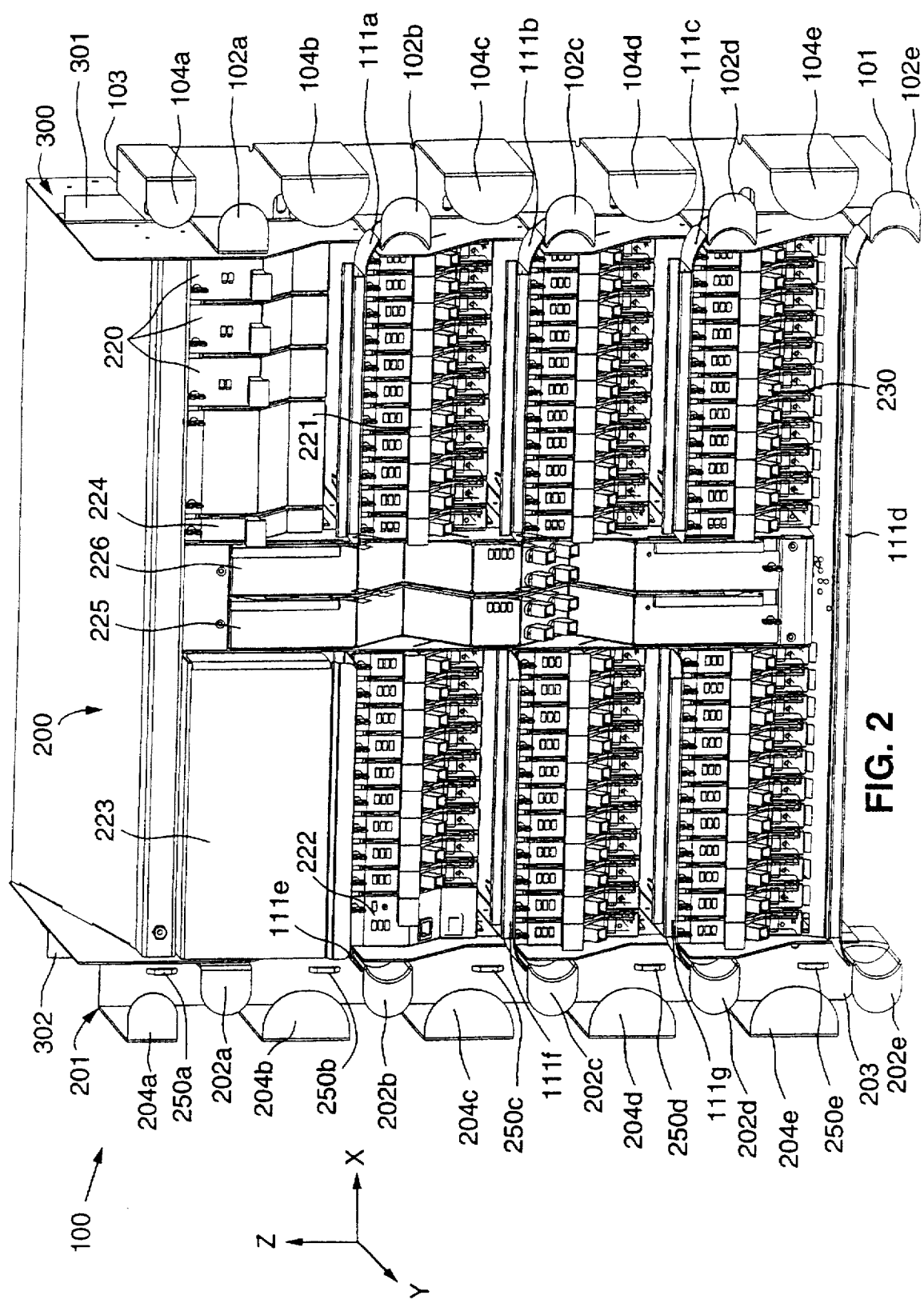
FIG. 2 is an isometric drawing of a fiber management system in accordance with one embodiment of the invention.

FIG. 2 is an isometric drawing of a fiber management system 100 in accordance with one embodiment of the invention. An X-Y-Z coordinate system is defined in FIG. 2. This coordinate system is used in FIGS. 3–8. As described in more detail below, fiber management system 100 routes a plurality of optical fibers (not shown) in an organized manner.

Fiber management system 100 includes HDT 200, fiber guides 101 and 201, and fiber trays 111a–111g. HDT 200 includes power supplies 220, sixty four ODU's such as ODU 221, alarm interface unit 222, alarm access panel 223, circuit identification chart 224, network interface units 225 and 226, and frame 300, which includes extensions 301 and 302. One of network interface units 225–226 is used during normal operation of HDT 200, and the other is used as a back-up unit. Power supplies 220, alarm interface unit 222, alarm access panel 223, circuit identification chart 224, network interface units 225–226, and the ODUs are described briefly below.

Each network interface unit 225–226 is connected to main switches within the central office by up to eight optical fibers. In this manner, network interface units 225–226 are able to communicate with the central office. Network interface units 225–226 are powered by on-board power supplies. Network interface units 225–226 are connected to the ODUs through a backplane of HDT 200 (not shown). The backplane facilitates the routing of information between the network interface units 225–226 and the ODUs. Optical fibers are routed from the ODUs to corresponding ONUs out in the field. Alarm interface unit 222 monitors the various elements of HDT 200 and reports the status of these elements to alarm access panel 223. Alarm access panel 223 provides access for the local Regional Bell Operating Center (RBOC) to monitor the alarm interfaces. Power supplies 220 provide power to the ODUs and alarm interface unit 222. Circuit identification chart 224 is a pull-out chart which is used to record routing information associated with the fibers routed to and from HDT 200. For example, chart 224 can be used to record the destination of each of the fibers coupled to the ODUs.

Each ODU includes a conventional SC/SC bulkhead connector, such as connector 230, which is adapted to receive a conventional optical fiber. Fiber management system 100 is designed to be used with class IVa, single-mode, dispersion-unshifted fiber as defined by the EIA and as specified in Bellcore TA-NWT-000909. The core of the optical fiber has a diameter of approximately 8.7 to 9.4 µm. A cladding located around the core results in an optical fiber having a diameter of approximately 125 µm. A plastic coating having a thickness of approximately 62.5 µm is located about the cladding, thereby resulting in a cabled optical fiber having a diameter of approximately 250 µm. A protective outer jacket is formed over the plastic coating, thereby providing a optical fiber cable having a total diameter of approximately 3 mm. The minimum bend radius is typically specified as five times the cable diameter when the cable is unstressed, and ten times the cable diameter when the cable is stressed. The previously described optical fiber cable therefore has a minimum bend radius of approximately 1.2 inches when stressed and approximately 0.6 inches when unstressed. It is understood that the principle described may be utilized with optical fibers of any type and dimension.

Fiber guides 101 and 201 are mounted in a vertical position along the sides of frame 300 of HDT 200, while fiber trays 111a–111g are mounted in a horizontal position long the front of frame 300 of HDT 200. Fiber guide 101 includes a plurality of inner fingers 102a–102e and a plurality of outer fingers 104a–104e which extend forward from a backplate 103. Similarly, fiber guide 201 includes a plurality of inner fingers 202a–202e and a plurality of outer fingers 204a–204e which extend forward from a backplate 203. Each of fiber guides 101 and 201 has a plurality of lances which protrude from their respective backplates 103 and 203. Lances 250a–250e are visible on fiber guide 201. However, the lances of fiber guide 101 are not visible in FIG. 2.

Figure 3:
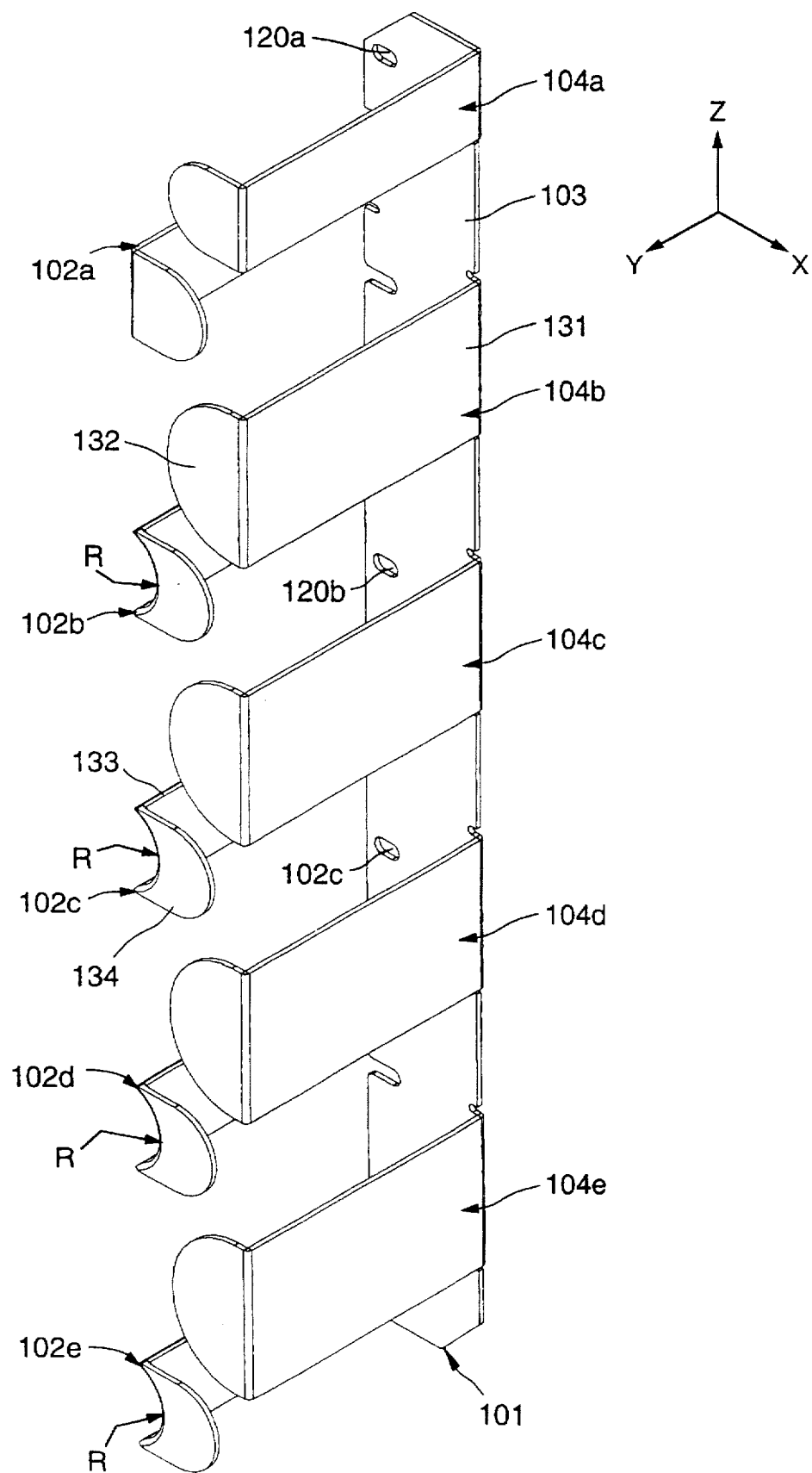
FIG. 3 is an isometric view of a fiber guide in accordance with the invention.

FIG. 3 is an isometric view of fiber guide 101. Each of outer fingers 104a–104e has a first portion which extends forward from backplate 103, substantially parallel to the Y-Z plane. For example, outer finger 104b has a first portion 131. In the described embodiment, each first portion of outer fingers 104a–104e has a length along the Y-axis of approximately 4.94 inches. Each of outer fingers 104a–104e further has an angled tip which extends from the end of a corresponding first portion, substantially in parallel to the X-Z plane. For example, outer finger 104b has a tip 132. In the described embodiment, each tip of outer fingers 104a–104e has a semi-circular shape with a radius of 1.250 inches. In other embodiments, the tips of outer fingers 104a–104e can have other shapes.

Similarly, each of inner fingers 102a–102e has a first portion which extends forward from backplate 103, substantially parallel to the Y-Z plane. For example, inner finger 102c has a first portion 133. In the described embodiment, each first portion of inner fingers 102a–102e has a length along the Y-axis of approximately 4.94 inches. Each of inner fingers 102a–102e further has an angled tip which extends from the end of a corresponding first portion, substantially in parallel to the X-Z plane. For example, inner finger 102c has a tip 134. In the described embodiment, each tip of inner fingers 102a–102e extends 1.597 inches. The end of each tip of inner fingers 102a–102e has a semi-circular shape with a radius of 0.75 inches.

The tips of inner fingers 102a–102e and outer fingers 104a–104e extend toward each other in an overlapping manner. As a result, optical fiber can be manually threaded between inner and outer fingers 102a–102e, 104a–104e without much difficulty. However, once the optical fiber has been threaded into fiber guide 101, this fiber will be retained in fiber guide 101 until it is manually un-threaded from fingers 102a–102e and 104a–104e.

The first portion of each of inner fingers 102b–102e includes a curved portion having a radius R, which is used to control the routing of optical fiber. In the described embodiment, R is equal to 0.80 inches. This radius R is selected to insure that an optical fiber routed over the curved portion of any one of inner fingers 102b–102e will not bend to a radius less than the minimum bend radius of the optical fiber. The manner in which the optical fibers are routed over the curved portions of inner fingers 102b–102e ensures that these optical fibers are in an unstressed condition. As previously discussed, the minimum bend radius of an unstressed optical fiber is approximately 0.6 inches. The radii R of the curved portions of inner fingers 102b–102e are therefore greater than the minimum bend radius of the optical fiber. The routing which ensures that the optical fibers are unstressed is discussed in more detail below in connection with FIG. 8.

Backplate 103 includes a plurality of holes 120a–120c which are used to mount fiber guide 101 to frame 300 of HDT 200. In one embodiment, screws are applied through holes 120a–120c in backplate 103 and corresponding holes in frame extension 301 (FIG. 2), thereby securing fiber guide 101 to frame 300.

Figure 4:
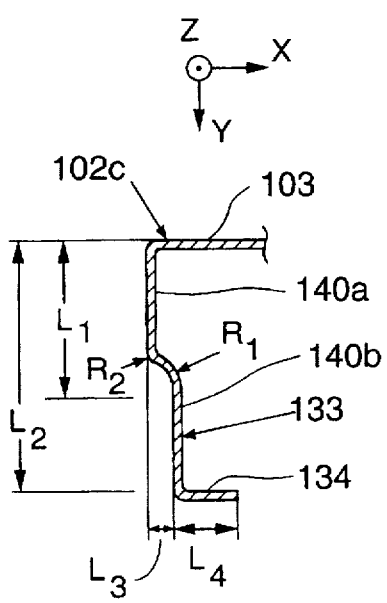
FIG. 4 is a cross sectional view of an inner finger of the fiber guide of FIG. 3.

FIG. 4 is a cross sectional view of inner finger 102c. First portion 133 of inner finger 102c includes a straight portion 140a and a curved portion 140b. Straight portion 140a has a substantially planar shape and extends forward from backplate 103 as illustrated. Curved portion 140b, which includes the previously described radius R (FIG. 3), extends from straight portion 140a to tip 134. The lengths and radii illustrated in FIG. 4 have the dimensions listed in Table 1 in accordance with one embodiment of the invention.

TABLE 1

| L1 = | 2.932 inches |
| L2 = | 4.940 inches |
| L3 = | 0.500 inches |
| L4 = | 1.097 inches |
| R1 = | 0.800 inches |
| R2 = | 0.190 inches |

Figure 5:
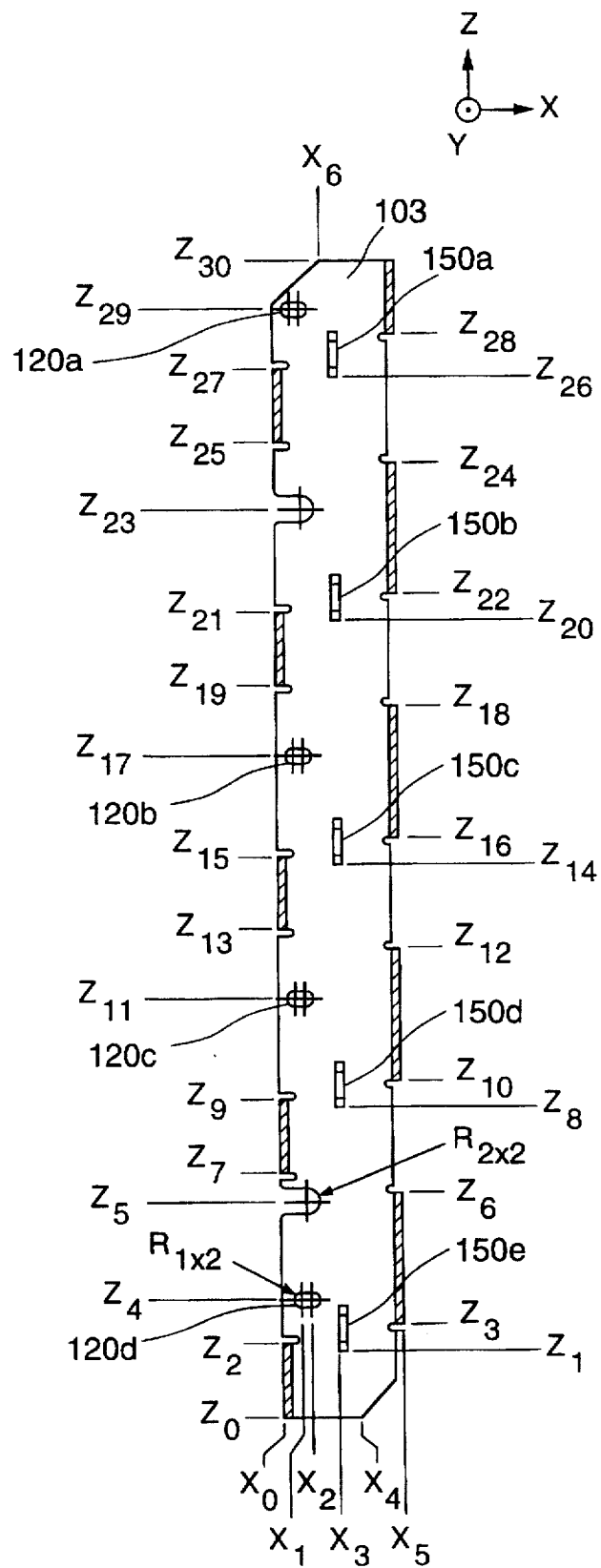
FIG. 5 is a front view of the fiber guide of FIG. 3 with the fingers removed.

FIG. 5 is a front view of fiber guide 101 with inner fingers 102a–102e and outer fingers 104a–104e removed for purposes of illustration. FIG. 5 illustrates an additional opening 120d in backplate 103 which was not visible in FIG. 3o This opening 120d is used in the same manner as openings 120a–120c to affix fiber guide 101 to frame 300. FIG. 5 also illustrates a plurality of lances 150a–150e which were not visible in the views of FIGS. 2 and 3. Each of lances 150a–150e extends out from backplate 103, thereby allowing a fiber tie to be looped through each lance. As described in more detail below, such fiber ties are used to secure optical fiber to backplate 103.

FIG. 5 also provides a plurality of reference points X0–X6 and Z0–Z30 which define the dimensions of fiber guide 101. Reference point X0 designates 0.00 inches along the X-axis and reference point Z0 designates 0.00 inches along the Z-axis. All other "X" reference points define particular distances from reference point X0, and all other "Z" reference points define particular distances from reference point Z0. Table 2 lists the distances associated with reference points X1–X6 and Z1–Z30 in accordance with one embodiment of the invention. All distances in Table 2 are given in inches.

TABLE 2

| | | |
|---|---|---|
| X1 = 0.300 | Z7 = 4.900 | Z19 = 14.720 |
| X2 = 0.500 | Z8 = 6.240 | Z20 = 16.060 |
| X3 = 1.080 | Z9 = 6.400 | Z21 = 16.220 |
| X4 = 1.420 | Z10 = 6.789 | Z22 = 16.610 |
| X5 = 2.310 | Z11 = 8.342 | Z23 = 18.342 |
| X6 = 0.890 | Z12 = 9.420 | Z24 = 19.240 |
| Z1 = 1.330 | Z13 = 9.810 | Z25 = 19.630 |
| Z2 = 1.490 | Z14 = 11.150 | Z26 = 20.970 |
| Z3 = 1.880 | Z15 = 11.310 | Z27 = 21.130 |
| Z4 = 2.342 | Z16 = 11.699 | Z28 = 21.820 |
| Z5 = 4.342 | Z17 = 13.342 | Z29 = 22.342 |
| Z6 = 4.510 | Z18 = 14.330 | Z30 = 23.322 |

Figure 6:
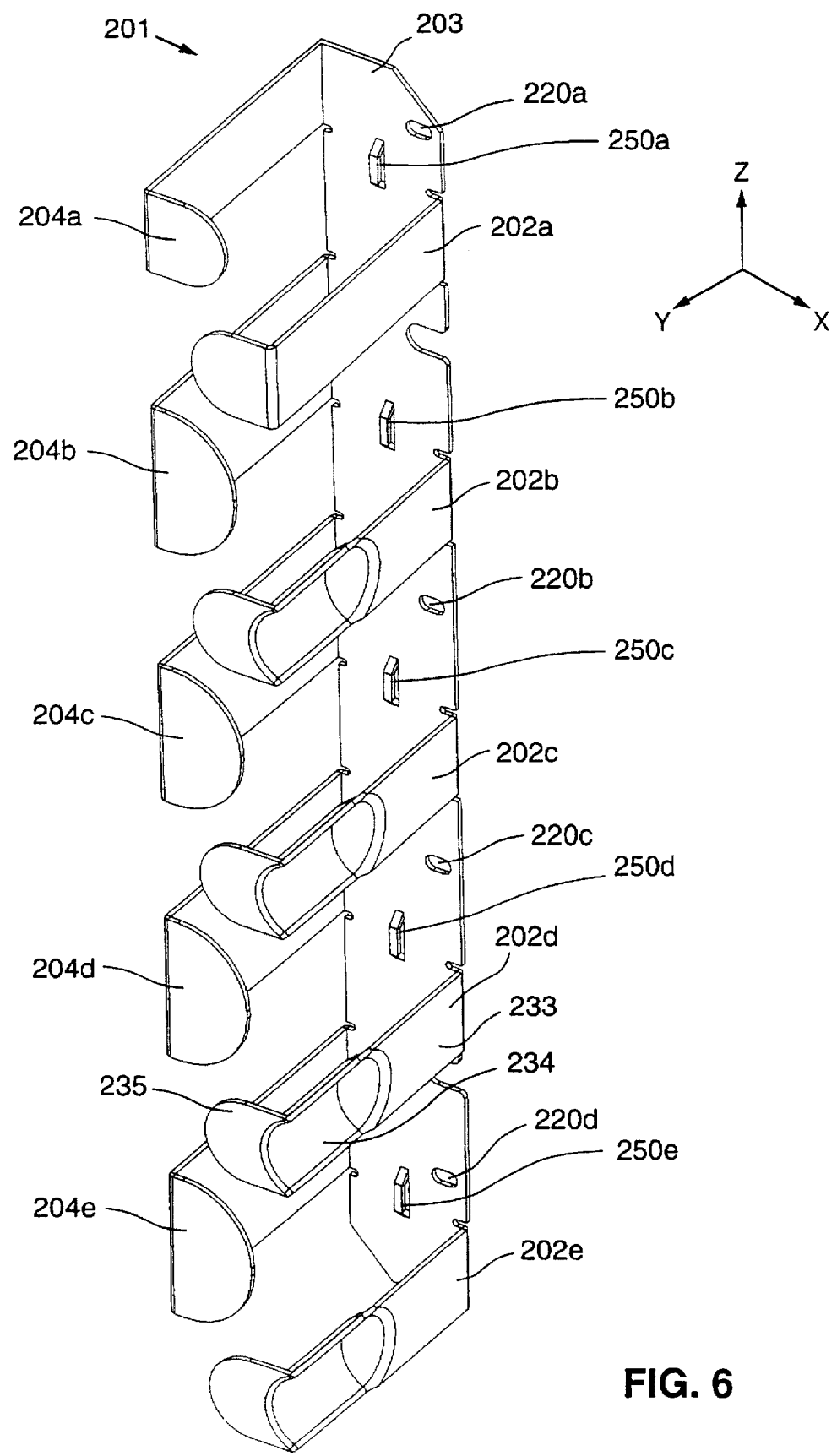
FIG. 6 is an isometric view of another fiber guide in accordance with the invention.

FIG. 6 is an isometric view of a fiber guide 201. In the illustrated embodiment, fiber guide 201 is a mirror image of fiber guide 101 (FIG. 3). Fiber guide 201 includes inner fingers 202a–202e, backplate 203, outer fingers 204a–204e, mounting openings 220a–220d, and lances 250a–250e. Fiber guide 201 is attached to frame extension 302 in the manner previously described for fiber guide 101. As described in more detail below, optical fibers are routed between fiber guide 201 and fiber trays 111d–111g. FIG. 6 clearly illustrates the straight and curved portions of inner fingers 202b–202e, as well as the configuration of lances 250a–250e.

Figure 7:
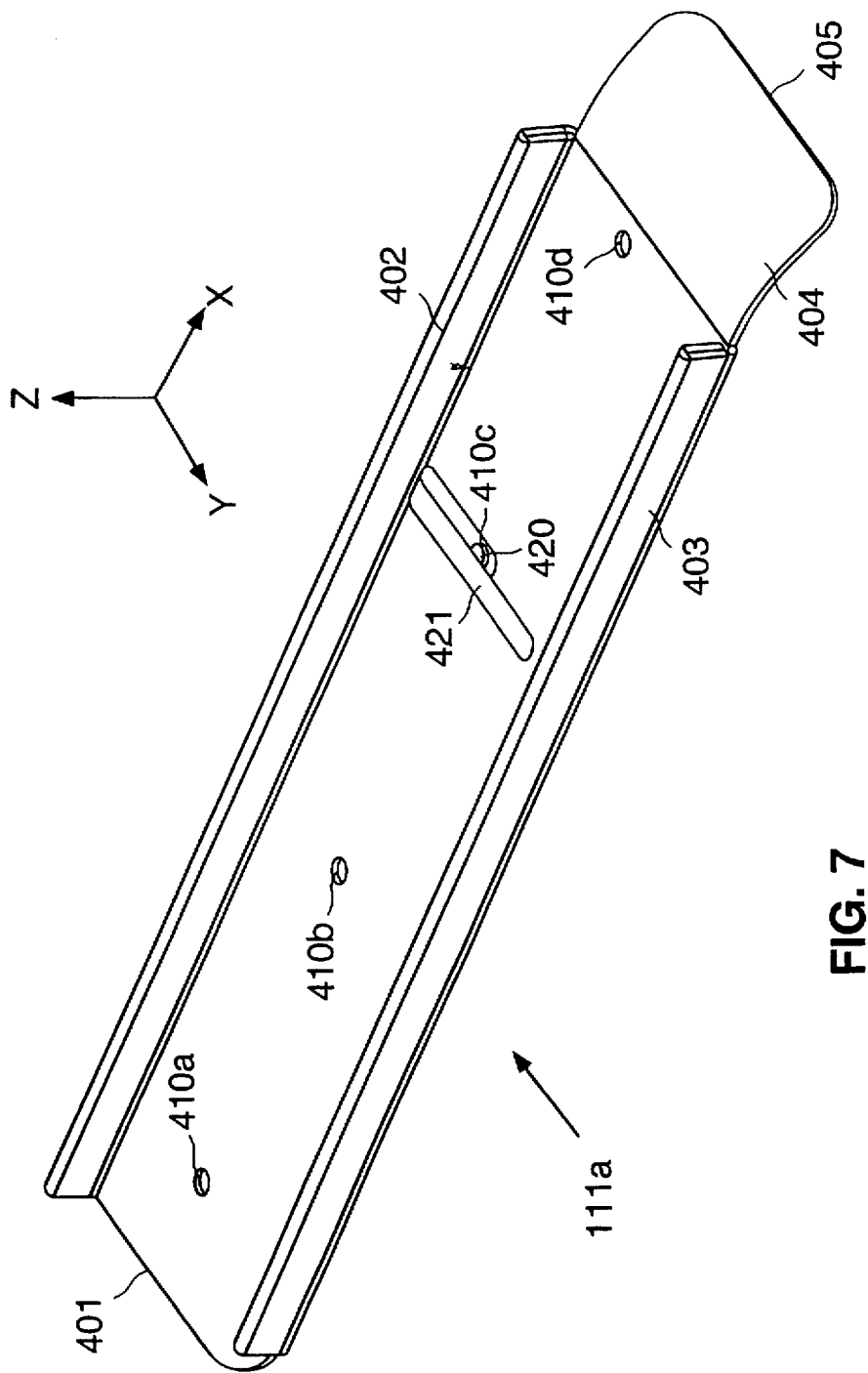
FIG. 7 is an isometric view of a fiber tray in accordance with the invention.

FIG. 7 is an isometric view of fiber tray 111a. Because fiber trays 111b–111g are substantially identical to fiber tray 111a, only fiber tray 111a will be described in detail. Fiber tray 111a includes baseplate 401, side flanges 402 and 403 and curved lip 404. Baseplate 401 has a length along the X-axis of approximately 8.25 inches and a depth along the Y-axis of approximately 2 inches. Side flanges 402 and 403, which have a height along the Z-axis of approximately 0.4 inches, help to retain optical fibers within fiber tray 111a. Openings 410a–410d extend through baseplate 401 and allow fiber tray 111a to be connected to an underlying portion of frame 300 using rivets. Each rivet also holds a vinyl coated flexible hairpin retainer to baseplate 401. FIG. 7 illustrates one such retainer 421, which is connected to fiber tray 111a by a rivet 420 inserted through opening 410c. Optical fibers which are routed along fiber tray 111a are looped under retainer 421, thereby holding these optical fibers down within fiber tray 111a.

Fiber tray 111a is mounted to frame 300 of HDT 200 such that curved lip 404 extends toward the curved portion of inner finger 102b (FIG. 2). Curved lip 404 terminates in free end 405, which is positioned immediately adjacent to the curved portion of inner finger 102b. Curved lip 404 has a radius R which is greater than the minimum bend radius of the optical fibers, thereby preventing the optical fibers routed over lip 404 from bending to a radius less than the minimum bend radius. In the described embodiment, the radius R of curved lip 404 is 1.50 inches. Curved lip 404 forms a 45 degree arc.

Figure 8:
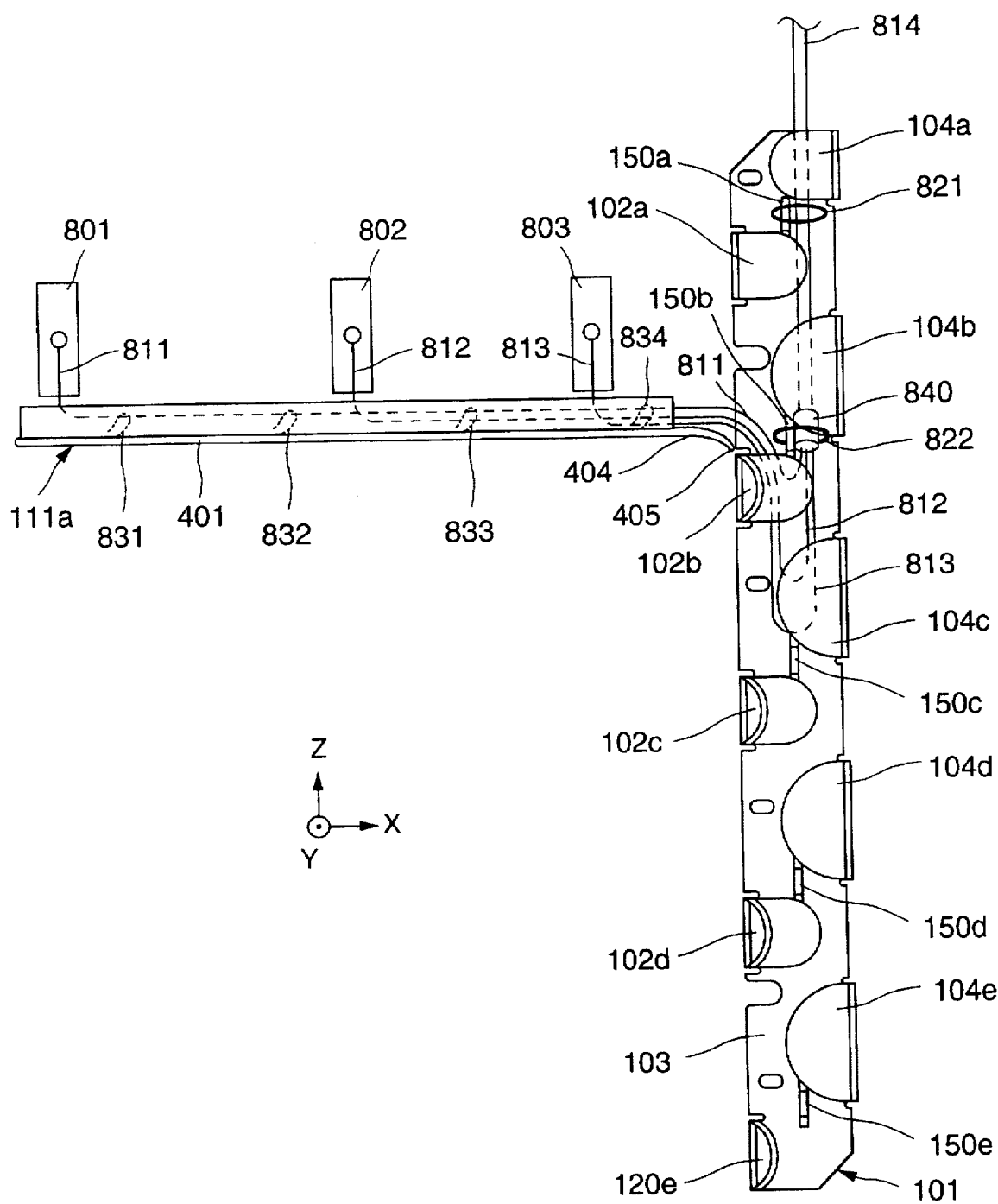
FIG. 8 is a schematic diagram illustrating the routing of three optical fibers in accordance with one embodiment of the invention.

FIG. 8 is a front view which illustrates the routing of three optical fibers 811–813 in accordance with one embodiment of the invention. Each of optical fibers 811–813 is coupled to a corresponding ODU 801–803. The end of each optical fiber includes a connector which fits into the SC/SC bulkhead connectors of ODUs 801–803. Each of fibers 811–813 extends from its corresponding ODU to baseplate 401 of fiber tray 111a. Conventional connector elements (not shown), available from 3M Corp. or Siecor, Inc., are used to limit the bend radius of fibers 811–813 to an acceptable limit as these fibers 811–813 are routed from ODUs 801–803 to fiber tray 111a. Each of fibers 811–813 is held in fiber tray 111a by previously described hairpin retainers 831–834. Fibers 811–813 are routed along baseplate 401 and over curved lip 404. As previously discussed, the radius of curved lip 404 is large enough to prevent fibers 811–813 from bending past their minimum bend radius.

Fibers 811–813 are further routed over the curved portion of inner finger 102b and extend downward into fiber guide 101. Again, the radius of the curved portion of inner finger 102b is larger than the minimum bend radius of fibers 811–813. Free end 405 of lip 404 is illustrated as being substantially continuous with the curved portion of inner finger 102b. Free end 405 can alternatively contact or not contact the curved portion of finger 102b. In another embodiment, curved lip 404 partially overlaps the curved portion of finger 102b. Alternatively, the curved portion of finger 102b can partially overlap curved lip 404.

Fibers 811–813 reverse direction and are routed back up through fiber guide 101. The fibers are coupled to backplate 103 of fiber guide 101 by looping fiber ties 821 and 822 through lances 150a and 150b, respectively, and securing the fiber ties around fibers 811–813. In reversing direction, the fibers extend along the Y-axis length of fiber guide 101. The Y-axis length of fiber guide 101 is selected such that the optical fibers are not bent beyond their minimum bend radius when extending between fiber tray 111a and backplate 103. As previously described, the Y-axis length of fiber guide 101 is 4.94 inches in the present embodiment.

In the illustrated embodiment, optical fibers 811–813 are part of a multi-fiber cable 814 (although this is not necessary). Multi-fiber cable 814 includes a plurality of optical fiber cables which are bundled in a protective cover. Although only three fibers 811–813 are shown, it is understood that more fibers (e.g., six or twelve), are typically included in a multi-fiber cable. A furcation tube 840 is provided near the end of multi-fiber cable 814. Furcation tube 840 allows the individual optical fibers 811–813 to be separated and brought out of the protective cover of the multi-fiber cable. Cable tie 822 holds furcation tube 840 to lance 150b. In the described embodiment, the length of each of optical fibers 811–813 from their respective ends to furcation tube 840 is approximately 18 inches. This length is selected such that each of fibers 811–813 is capable of being routed to ODUs 801–803 without bending past its minimum bend radius. Because each of fibers 811–813 has the same length, the fibers connected to ODUs which are located closer to lip 404 will extend further downward into fiber guide 101. For example, fiber 813 extends further downward into fiber guide 101 than fibers 811 and 812.

In a particular embodiment, a multi-fiber cable having twelve individual optical fibers is used to serve each row of ODUs. In such an embodiment, each multi-fiber cable has an integer length, with the longer multi-fiber cables being used to serve the lower rows of ODUs. The furcation tube of each of these multi-fiber cables is coupled to a corresponding lance within the associated fiber guide. For example, the furcation tube of the multi-fiber cable serving fiber tray 111b is coupled to lance 150c, the furcation tube of the multi-fiber cable serving fiber tray 111c is coupled to lance 150d, and the furcation tube of the multi-fiber cable serving fiber tray 111d is coupled to lance 150e.

The previously described routing system ensures that the optical fibers are in an unstressed condition when routed through fiber guide 101 and over fiber trays 111b–111d.

Figure 9:
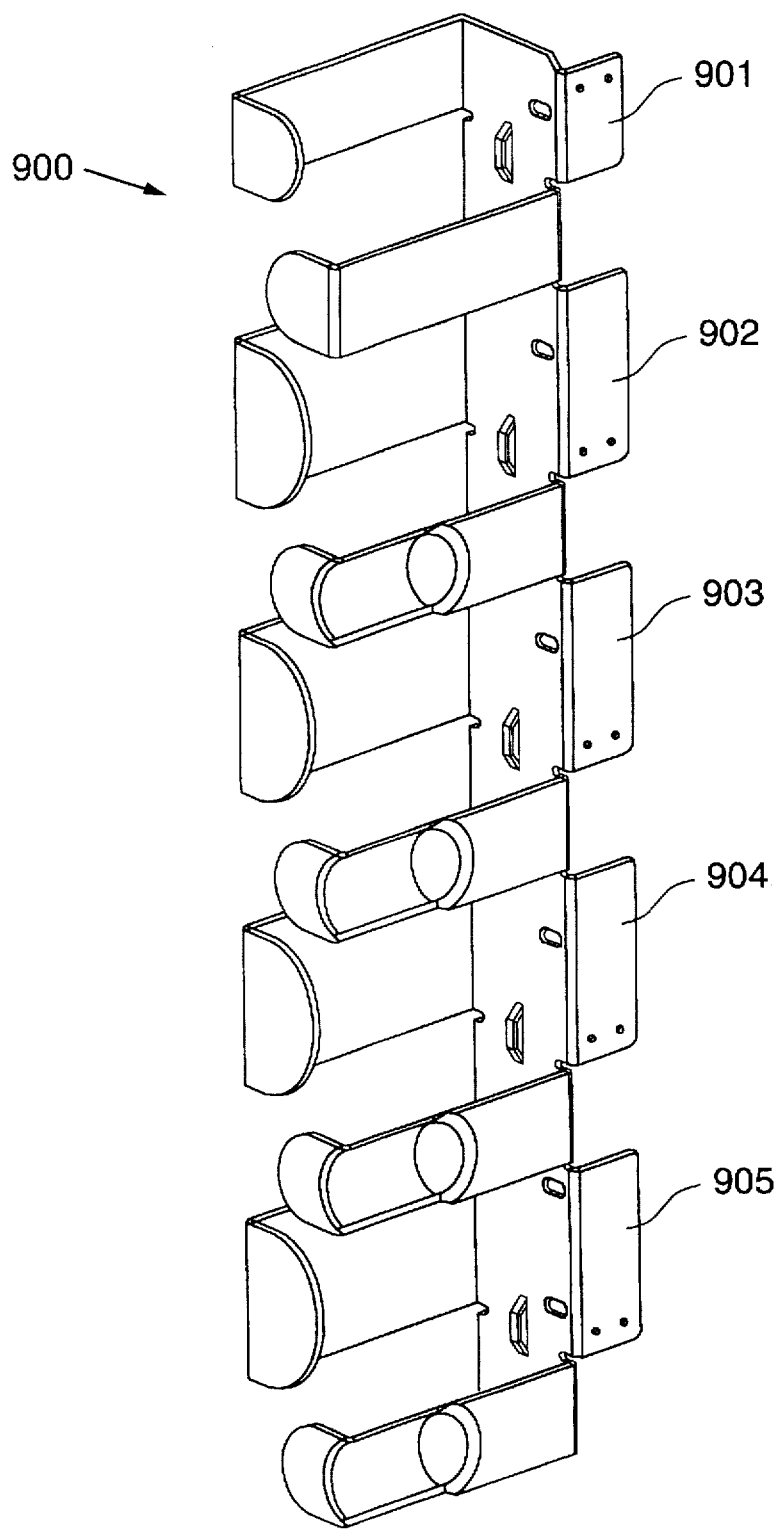
FIG. 9 is an isometric view of a fiber guide in accordance with an alternative embodiment.

Although the invention has been described in connection with several embodiments, it is understood that this invention is not limited to the embodiments disclosed, but is capable of various modifications which would be apparent to one of ordinary skill in the art. For example, rather than maintaining the inner fingers and fiber trays as distinct elements, it is possible to form a fiber tray which includes an integrated inner finger. Moreover, it is possible to form a fiber guide which includes extension portions which allow the fiber guide to be connected directly to the HDT frame. FIG. 9 is an isometric view of such a fiber guide 900, which includes extension portions 901–905 which are adapted to be connected directly to frame 300. Thus, the invention is limited only by the following claims.

I claim:

1. A fiber management system for routing optical fiber having a minimum bend radius, the system comprising:
    a plurality of fiber trays, each having a baseplate and a curved lip which is continuous with an end of the baseplate, wherein each baseplate is configured for routing the optical fiber along a first axis, and wherein each curved lip has a radius at least as large as the minimum bend radius of the optical fiber; and
    a fiber guide for routing the optical fiber along a second axis perpendicular to the first axis, the fiber guide having a plurality of interleaved inner fingers and outer fingers, wherein each of the inner and outer fingers has an angled tip for retaining the optical fiber, and wherein each of the inner fingers has a curved portion having a radius at least as large as the minimum bend radius of the optical fiber, each of the fiber trays being positioned adjacent to a corresponding one of the inner fingers, such that the curved lip of each of the fiber trays is positioned adjacent to the curved portion of the corresponding one of the inner fingers.

2. The fiber management system of claim 1, further comprising first means for securing the optical fiber within the fiber guide.

3. The fiber management system of claim 2, wherein the fiber guide further comprises a backplate from which the plurality of inner and outer fingers extend, wherein the first means for securing enables the optical fiber to be secured to the backplate.

4. The fiber management system of claim 3, wherein the first means for securing comprises a lance which protrudes from the backplate.

5. The fiber management system of claim 4, wherein the first means for securing further comprises a tie which is looped through the lance and around the optical fiber.

6. The fiber management system of claim 5, wherein the tie secures a furcation tube which surrounds the optical fiber.

7. The fiber management system of claim 2, further comprising second means for securing the optical fiber within the fiber trays.

8. The fiber management system of claim 7, wherein the fiber trays, fiber guide, first means for securing and second means for securing are adapted to route the optical fiber in an unstressed condition.

9. The fiber management system of claim 1, further comprising means for securing the optical fiber within the fiber trays.

10. The fiber management system of claim 9, wherein the means for securing comprises a flange coupled to each of the fiber trays.

11. The fiber management system of claim 9, wherein the second means for securing comprises one or more retainers for holding the optical fiber in the fiber trays.

12. The fiber management system of claim 1, wherein the fiber guide is mounted vertically on a host digital terminal (HDT).

13. The fiber management system of claim 12, wherein the fiber trays are mounted horizontally on the host digital terminal (HDT).

14. The fiber management system of claim 1, wherein the fiber trays are mounted horizontally on a host digital terminal (HDT).

15. The fiber management system of claim 1, wherein the tips of the inner fingers overlap the tips of the outer fingers.

16. The fiber management system of claim 1, wherein the curved lip of each of the fiber trays terminates in a free end which is substantially continuous with an edge of the curved portion of a corresponding inner finger.

17. The fiber management system of claim 1, wherein the curved lip of one of the fiber trays partially overlaps the curved portion of a corresponding inner finger.

18. The fiber management system of claim 1, wherein the curved portion of one of the inner fingers partially overlaps the curved lip of a corresponding fiber tray.

19. A fiber management system for routing optical fiber having a minimum bend radius, the system comprising:
    a plurality of fiber trays, each having a baseplate and a curved lip which is continuous with an end of the baseplate, wherein each baseplate is configured for routing the optical fiber along a first axis, and wherein each curved lip has a radius selected to prevent the optical fiber from bending past the minimum bend radius of the optical fiber; and
    a fiber guide for routing the optical fiber along a second axis perpendicular to the first axis, the fiber guide having a plurality of interleaved inner fingers and outer fingers, wherein each of the inner and outer fingers has an angled tip for retaining the optical fiber, and wherein each of the inner fingers has a curved portion having a radius selected to prevent the optical fiber from bending past the minimum bend radius of the optical fiber, each of the fiber trays being positioned adjacent to a corresponding one of the inner fingers, such that the curved lip of each of the fiber trays is positioned adjacent to the curved portion of the corresponding one of the inner fingers.

20. A method for routing optical fiber having a minimum bend radius, the method comprising the steps of:
    routing the optical fiber along a fiber tray substantially along a first axis, the fiber tray having a curved lip with a radius at least as large as the minimum bend radius;
    securing the optical fiber within the fiber tray;
    routing the optical fiber into a fiber guide in a first direction along a second axis which is perpendicular to the first axis, the fiber guide comprising a backplate and a plurality of interleaved fingers extending from the backplate, at least one of the fingers having a curved portion located adjacent to the curved lip of the fiber tray, the curved portion having a radius at least as large as the minimum bend radius of the optical fiber, wherein the optical fiber is routed over the curved portion of the at least one finger;
    retaining the optical fiber within the fiber guide by angled tips located at the ends of the interleaved fingers;

routing the optical fiber in a second direction along the second axis within the fiber guide, the second direction being opposite the first direction; and securing the optical fiber to the backplate at a location where the optical fiber is routed in the second direction along the second axis.

21. A host digital terminal comprising:

a frame;

a plurality of optical distribution units supported in one or more horizontal rows within the frame, wherein each of the optical distribution units is configured to receive an optical fiber having a minimum bend radius;

one or more fiber trays coupled to the frame, wherein each of the fiber trays protrudes from the frame below a corresponding row of optical distribution units, each of the fiber trays having a planar baseplate which is located below a corresponding row of optical distribution units and a curved lip which is continuous with the baseplate at an end of the corresponding row, the curved lip having a radius at least as large as the minimum bend radius of the optical fiber; and a fiber guide coupled to the frame, wherein the fiber guide comprises one or more inner fingers, each having an angled tip for retaining the optical fiber and a curved portion with a radius at least as large as the minimum bend radius of the optical fiber, wherein each of the fiber trays being positioned adjacent to a corresponding one of the inner fingers, such that the curved lip of each of the fiber trays is positioned adjacent to the curved portion of the corresponding one of the inner fingers.

22. The host digital terminal of claim 21, further comprising one or more clips for retaining the optical fiber in the fiber trays.

23. The host digital terminal of claim 21, wherein the fiber guide further comprises a backplate and one or more outer fingers, wherein the inner and outer fingers extend from opposing edges of the backplate, and wherein each of the outer fingers has an angled tip for retaining the optical fiber, the angled tips of the inner fingers being interleaved with the angled tips of the outer fingers.

24. The host digital terminal of claim 23, further comprising means for securing the optical fiber to the backplate of the fiber guide.

25. The host digital terminal of claim 23, further comprising an optical fiber which is coupled to one of the optical distribution units, secured to the baseplate of a corresponding fiber tray, routed over the curved lip of the fiber tray and the curved portion of a corresponding inner finger, and secured to the backplate of the fiber guide.

* * * * *

UNITED STATES PATENT AND TRADEMARK OFFICE
CERTIFICATE OF CORRECTION

PATENT NO.    :   5,715,348
DATED         :   February 3, 1998
INVENTOR(S)   :   Dean R. Falkenberg and Russell L. Tucker It is certified that error appears in the above-identified patent and that said Letters Patent is hereby corrected as shown below:

Col. 4, line 59,
    Delete "3o" and insert --3.--.

Col. 7, line 21,
    Delete "I" and insert --We--.

Signed and Sealed this

Twenty-first Day of July, 1998

*Attest:*

BRUCE LEHMAN

*Attesting Officer*    *Commissioner of Patents and Trademarks*